United States Patent [19]

Barnes et al.

[11] Patent Number: 5,143,446
[45] Date of Patent: Sep. 1, 1992

[54] LIGHTING FIXTURE WITH AN IMPROVED LIGHT TRANSMITTING FILM

[75] Inventors: Josh T. Barnes; Thomas F. Barnes; Earl E. Smith; Dale A. Troppman, all of Charlevoix, Mich.

[73] Assignee: Lexalite International Corporation, Charlevoix, Mich.

[21] Appl. No.: 833,520

[22] Filed: Feb. 11, 1992

[51] Int. Cl.⁵ ................................................ F21J 9/00
[52] U.S. Cl. .................................... 362/293; 359/884
[58] Field of Search ........................ 359/884; 362/293

[56] References Cited

U.S. PATENT DOCUMENTS

| | | | |
|---|---|---|---|
| 3,284,625 | 11/1966 | Barnes | 362/293 |
| 4,380,794 | 4/1983 | Lawson | 362/296 |
| 4,524,104 | 6/1985 | Hagio et al. | 428/341 |
| 4,836,642 | 6/1989 | Matsumoto et al. | 428/364 |
| 4,903,180 | 2/1990 | Taylor | 362/337 |
| 4,971,847 | 11/1990 | Freed | 428/36.7 |

*Primary Examiner*—Carroll B. Dority
*Attorney, Agent, or Firm*—Mason, Kolehmainen, Rathburn & Wyss

[57] ABSTRACT

An improved lighting fixture includes a light reflecting and/or light transmitting member for reflecting or transmitting visible light. A light transmitting film is disposed adjacent the light reflecting or transmitting member. The light transmitting film is formed of a glutarimide acrylic copolymer. The glutarimide acrylic copolymer film provides protection to the light reflecting and/or transmitting member from damaging effects of ultraviolet radiation and is substantially resistant to ultraviolet radiation.

6 Claims, 1 Drawing Sheet

LIGHTING FIXTURE WITH AN IMPROVED LIGHT TRANSMITTING FILM

BACKGROUND OF THE INVENTION

1. Field of the Invention

The present invention generally relates to lighting fixtures and luminaires, and more particularly to an improved light transmitting film for use with a light reflecting or light transmitting member of a lighting fixture.

2. Description of the Prior Art

As used herein, the term lighting fixture includes luminaires and indoor and outdoor lighting fixtures. Typically a lighting fixture includes a light source, a light reflecting member, such as, a reflector, and/or a light transmitting member, such as, a refractor, a lens, or an enclosure. The reflecting and/or transmitting members are to redirect or direct the light rays emitted from the light source. Due to the temperatures resulting from high power lamps, a high temperature resistant material, usually polycarbonate, glass or acrylic is used for the light reflecting and/or light transmitting members. However, none of the known materials provide both significant impact strength and resistance to degradation from ultraviolet (UV) radiation and heat. Glass lacks impact strength and is relatively easily cracked or shattered. Plastic materials become yellow over time under the effects of UV radiation received from the light source.

U.S. Pat. No. 3,284,625 issued to Barnes and assigned to the present assignee, discloses a disposable liner or insert for protecting a plastic light transmitting member from degradation from ultraviolet radiation. The liner conforms to the interior configuration of a globe or refractor of a lighting fixture and has sufficient thickness to be opaque to ultraviolet radiation from the light source which would otherwise yellow the wall of the outer light transmitting element. The liner itself becomes yellowed over time and is removed, disposed of and replaced by a new liner. In this way, a relatively simple, inexpensive improved structure is provided by the disposable liner. The insert is made of a film of plastic material, for example, such as by vacuum molding a film of polycarbonate material which begins at about 0.008" thick and provides a resulting liner having a thickness of 0.002-inch or 0.003-inch. Where the liner is made of an acrylic plastic material, a somewhat thicker wall thickness is required, for example of 0.010-inch or 0.012-inch.

U.S. Pat. No. 4,903,180 issued to Taylor et al. discloses a cover for protecting internal reflecting prisms formed on an outer surface of a reflector from deposits and contaminants from the surrounding atmosphere. The cover is vacuum formed from a ⅛-inch thick sheet of clear acrylic resin.

U.S. Pat. No. 4,380,794 discloses a surgical lamp including a reflector molded from polyetherimide resin and having a dichroic coating for reflecting visible light while passing infrared light.

It is desirable to provide a permanent improved light transmitting film for use with a light reflecting and/or light transmitting member for increasing the longevity of a lighting fixture, and that does not, itself, require periodic replacement. It is further desirable to provide such an improved light transmitting film that achieves the required lumen output substantially without negative effect.

SUMMARY OF THE INVENTION

Among the important objects of the present invention are to provide an improved light transmitting film for use with a lighting fixture, to provide such film that is suitable for various applications and that overcomes many of the disadvantages of the prior art devices.

In brief, the objects and advantages of the present invention are achieved by an improved lighting fixture includes a light reflecting and/or light transmitting member for reflecting and/or transmitting light. A light transmitting film is disposed adjacent the light reflecting and/or light transmitting member. The light transmitting film is formed of a glutarimide acrylic copolymer. The glutarimide acrylic copolymer film provides protection to the light reflecting and/or light transmitting member from damaging effects of ultraviolet radiation and is, itself, substantially resistant to ultraviolet radiation.

BRIEF DESCRIPTION OF THE DRAWINGS

The present invention together with the above and other objects and advantages may best be understood from the following detailed description of the embodiment of the invention illustrated in the drawings, wherein.

DETAILED DESCRIPTION OF THE PREFERRED EMBODIMENT

Figure 1:
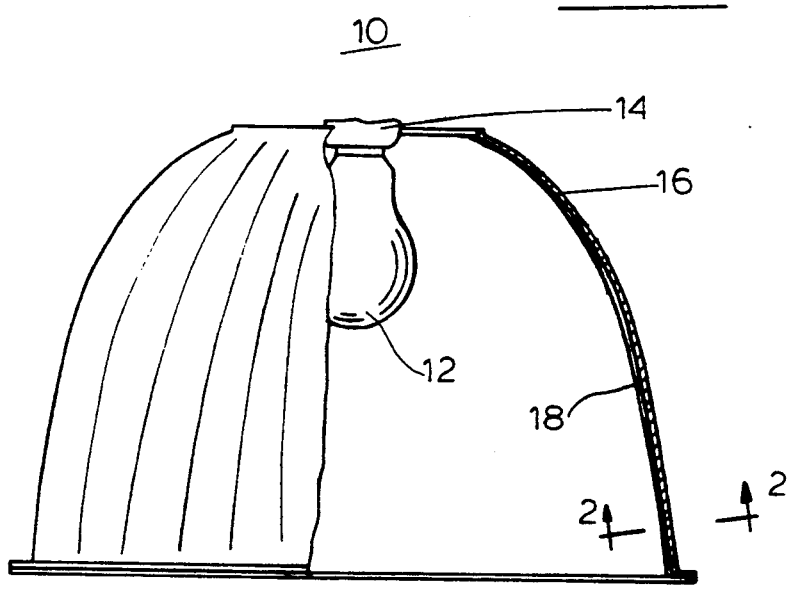
FIG. 1 is a side elevational view, partly broken away, of a lighting fixture constructed in accordance with the invention.

Referring now to the drawings, in FIG. 1 there is illustrated a lighting fixture constructed in accordance with the principles of the present invention and designated as a whole by the reference character 10. Although a lighting fixture including a reflector device is illustrated for purposes of description, it should be understood that the present invention is intended to be used with any optical components of lighting fixtures including lenses, refractors and other enclosures of all types.

Among its major components, the lighting fixture 10 includes an illumination source or lamp 12 secured in a lamp socket 14 and a light reflecting and/or light transmitting member 16 for reflecting and/or for transmitting visible light.

Lamp 12 can be one of various types, such as metal halide, mercury vapor, high pressure sodium, or other high intensity discharge lamp which generates ultraviolet radiation and significant heat. The light reflecting and/or light transmitting member 16 is formed of a suitable transparent or translucent material resistant to harmful effects of heat, for example, up to 240° F. or 115° C., tough enough to withstand impact, such as from thrown rocks, baseballs and the like and to withstand exposure to natural elements. Polycarbonate fulfills these requirements better than other comparatively priced material. Various commercially available thermoplastics and polycarbonates can be used for the light reflecting and/or light transmitting member 16, for example, polycarbonates sold by General Electric Company, Pittsfield, MA. under the registered trademark Lexan grades 263-112 and 243-112; polycarbonate by Dow Chemical Company, under the trademark Calibre 303-10; polypthalate carbonate sold by General Electric Company, Pittsfield, MA. under PPC 4703; and cobisphenol polycarbonate grade APEC 9350 sold by Miles, Inc. A UV stabilized grade of polycarbonate is required for outdoor use. Typically the light reflecting and/or light transmitting member 16 has a thickness in the range between 0.080-inch and 0.125-inch with overall thickness including prisms considerably greater, such as, in the range between, 0.125-inch and 0.250-inch.

Figure 2:
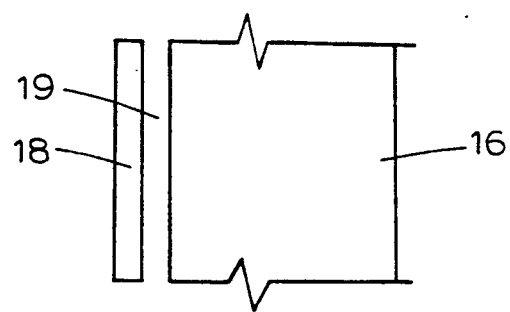
FIG. 2 is a greatly enlarged fragmentary cross-sectional view illustrating a light transmitting film of the invention with a light reflecting and/or light transmitting member of the lighting fixture of FIG. 1.

As illustrated in FIG. 2, a light transmitting film 18 is disposed adjacent to the light reflecting and/or light transmitting member 16, separated only by an air gap 19, which is generally intended to be as small as practical. The light transmitting film 18 preferably is formed from a glutarimide acrylic copolymer for example, by sheet extrusion or injection molding. Glutarimide acrylic copolymer in pellet form is sold by Rohm and Haas of Philadelphia, PA under the trademark registration Kamax T-260. Surprisingly and unexpectedly, the light transmitting film 18 made of glutarimide acrylic copolymer is opaque to ultraviolet radiation from the light source 12 which would otherwise yellow the wall of the light reflecting and/or light transmitting member 16 and is resistant to degradation from long-term ultraviolet radiation. The glutarimide acrylic copolymer light transmitting film 18 was made for this purpose in several thickness ranging from 0.010-inch to 0.040-inch, but other thickness may be found desirable for such applications. Hardness for glutarimide acrylic copolymer Kamax T-260 sold by Rohm and Haas is 100 on the Rockwell M Scale.

A glutarimide acrylic copolymer film is produced generally utilizing conventional plastic extrusion or vacuum forming technique. The glutarimide acrylic copolymer resin in its granular form is dried, for example, 4 hours at 250° F. utilizing desiccant type drying equipment. Due to optical clarity requirements of the finished product, highly polished, mirror quality take-off rolls must be used during the forming of the glutarimide acrylic copolymer film. The environment must be virtually dust free to prevent surface contamination of the glutarimide acrylic copolymer film and the end product must be protected on both sides, for example, such as by using polyethylene film for shipping purposes.

The light transmitting film 18 can be disposed adjacent to an outside surface of the light reflecting and/or light transmitting member 16 configured as a cover protecting the member from the sun's ultraviolet radiation and to facilitate cleaning. The light transmitting film 18 can be disposed adjacent to an inside surface of the light reflecting and/or light transmitting member 16 configured as an insert or liner protecting the member from ultraviolet radiation from the light source 12.

While the invention has been described with reference to details of the illustrated embodiment, these details are not intended to limit the scope of the invention as defined in the appended claims.

What is claimed is:

1. An improved lighting fixture including a light source comprising: an enclosure for said light source including
   light reflecting and/or light transmitting means for reflecting and/or transmitting visible light;
   a light transmitting film disposed adjacent and between said light source and said light reflecting and/or light transmitting means; said light transmitting film being formed of a glutarimide acrylic copolymer.

2. An improved lighting fixture as recited in claim 1 wherein said light transmitting film has a thickness in a range between 0.010-inch and 0.040-inch.

3. An improved lighting fixture as recited in claim 1 wherein said light transmitting film is opaque to ultraviolet radiation.

4. A lighting fixture including a light transmitting film located between a light source and a light reflecting and/or light transmitting member of said lighting fixture, said light transmitting film comprising:
   a glutarimide acrylic copolymer film disposed adjacent said light reflecting and/or light transmitting member; and said light transmitting film being substantially opaque to ultraviolet radiation.

5. A light fixture as recited in claim 4 wherein said light transmitting film is formed to approximate the contour of said adjacent light reflecting and/or light transmitting member.

6. A light fixture as recited in claim 4 wherein said light transmitting film has a thickness in a range between 0.010-inch and 0.040-inch.

* * * * *